J. RIDER.
Breech-Loading Fire-Arm.
No. 1.663.
Reissued May. 3. 1864.
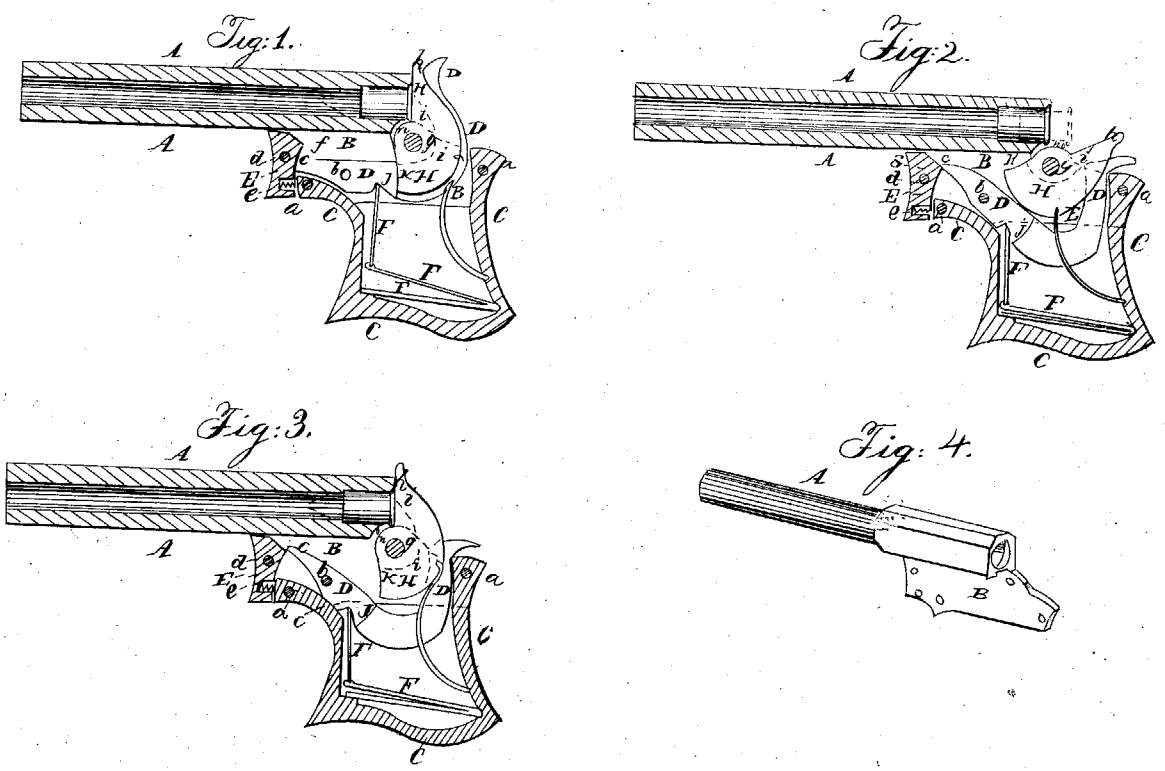
*Witnesses.*
P. Wilson
C. Ennis Jr
Joseph Rider
By Foley & Langston
N. PETERS, PHOTO-LITHOGRAPHER, WASHINGTON, D. C.

UNITED STATES PATENT OFFICE.

JOSEPH RIDER, OF NEWARK, OHIO, AND E. REMINGTON & SONS, OF ILION, NEW YORK, ASSIGNEES OF SAID RIDER.

IMPROVEMENT IN BREECH-LOADING FIRE-ARMS.

Specification forming part of Letters Patent No. 40,887, dated December 8, 1863; Reissue No. 1,663, dated May 3, 1864.

*To all whom it may concern:*

Be it known that JOSEPH RIDER, of Newark, in the county of Licking and State of Ohio, did invent certain new and useful Improvements in Breech-Loading Fire-Arms; and we do hereby declare that the following is a full, clear, and exact desc ption of the construction and operation of the same, reference being had to the accompanying drawings, making a part of this specification, in which—

Figure 1 represents a longitudinal section through a pistol constructed after his plan, and showing the breech-plate and hammer in position against the end of the bore of the barrel. Fig. 2 represents a similar section showing the breech-plate as drawn back and the hammer as on "the cock." Fig. 3 represents a similar section showing the breech-plate as up against the end of the barrel and the hammer as on the cock. Fig. 4 represents a perspective view of the barrel and lock and handle plate as made in one piece.

Similar letters of reference, where they occur in the several figures, denote like parts of the arm in all cases.

Many devices have been essayed for locking the breech-plate of a breech-loading fire-arm to prevent it from yielding to the force of the discharge, and even the hammer has been used as a locking mechanism; but none of these plans embrace the security and compactness of the plan herein described; nor are we aware that any fire-arm heretofore constructed upon this general principle has embraced so many advantages or has been made so simple, efficient, and cheap as the one hereinafter described and claimed.

The invention consists, first, in so constructing and arranging the breech-plate and hammer as that when the hammer is drawn back or on the cock, and the breech-plate drawn back to open the bore of the arm for receiving the cartridge, neither can be made to fly by accidentally or otherwise touching the trigger; and the invention further consists in so combining a hammer and an independent breech-plate as that the hammer shall lock the breech-plate when both are up against the end of the bore and the breech-plate lock the hammer when both are swung back to open the chamber to allow the cartridge to be inserted therein; and the invention further consists in so constructing and arranging a hammer and an independent breech-plate as that, while moving upon different centers and describing different arcs in their movement, they shall both, when up against the end of the barrel or bore of the arm, occupy substantially the same space.

To enable others skilled in the art to make and use the invention, the following description, in connection with the drawings, is given.

The barrel A is bored through and through, so as to load the arm at the breech with a metallic-cased cartridge. The barrel A, as well as the lock and handle-plate B, is formed in one piece, which not only facilitates the putting together of the fire-arm, but makes these two pieces more firm, while they serve as a guide for fitting the other pieces also. The handle and lock-frame C are united to the plate B at *a a*, and these two pieces may be said to constitute the permanent or immovable portions of the fire-arm. The hammer D is of an S form, though irregular in shape, and is pivoted to the plate B at a point, *b*, which point is forward of the rear end of the barrel A, and the point or tail *c* of the hammer serves as a dog for the trigger E to catch upon and hold the hammer at a cock, as shown in Figs. 2 and 3.

F is a mainspring, by which the hammer is actuated when released by the trigger. The trigger E is pivoted to the plate B at *d*, and a small spring, *e*, forces the lower end of the trigger forward and its upper end rearward, so that it will always be in position to catch the tail *c* of the hammer upon its point or projection *f*, and the compression of this spring lets off the hammer, which strikes the cartridge G, and, exploding its fulminate or priming, fires the charge in the usual way. The breech-plate H is pivoted at *g* directly under the rear end of the barrel A, and its upper end *h*, when against the rear end of the barrel, covers the bore thereof, except in one point, where the hammer strikes against a small portion of the heel of the cartridge to explode it. The breech-plate, too, is grooved, as shown by the dotted lines at *i*, so that the hammer D may work into said groove, and when both the breech-plate and hammer are against the end of the barrel, as shown in Fig. 1, they occupy, as it were, the same space, thus giving a neat and compact finish to the arm. It will be perceived that though the breech-plate itself is in advance of the hammer, its pivoted point *g* is in rear of the pivoted point *b* of the hammer, that they move in the arcs of different circles, but that when both are up, as shown in Fig. 1, they practically occupy the same space, though move independently of each other. There is a shoulder, *j*, formed on each side of the trigger-hammer D, (one only being seen,) and against these shoulders the curved side or part *k* of the breech-plate H snugly fits when the hammer is in the position shown in Fig. 1; and these shoulders and surfaces coming between the pivoted points of said hammer and breech-plate *b g* firmly lock the breech-plate against the force of the exploding charge. The tendency of the breech-plate in this position to fly back being taken on the pin *b* in a direct line with said pin—or, rather, taken on said pin in a line with the direction of force of recoil—is thus counteracted.

The hammer and breech-plate mutually lock each other under the different circumstances of their positions, as follows: When they are in the position shown in Fig. 1, the breech-plate cannot be drawn down until the hammer is first drawn down, as the hammer in this position locks the breech-plate; but when they are in the position shown in Fig. 2, the hammer cannot be let up, not even by pulling the trigger, until the breech-plate is first moved to near the end of its movement against the bore of the gun, or entirely so, thus in the two positions changing their active and passive characters, locking, and in turn being locked by the other. This is important both in resisting the force of the explosion, and as a security against the accidental flying up of the hammer while in the act of placing the cartridge in the bore, should the user, as he would be apt to do, unintentionally touch the trigger, the effect of which would be to jam the fingers.

On the breech-plate H there is a rigid pin, *n*, against which the flange of the cartridge-case comes, as shown in Fig. 2; when the arm is about to be loaded, allowing said cartridge to be only partially inserted in the bore of the arm, and when the breech-plate H is moved up it carries away its pin *n* with it, and the part *h* of the breech-plate coming against the cartridge pushes it home. Thus the charging of the arm with the cartridge is commenced and partially done by hand, and completed mechanically by the closing up of the breech-plate. When the breech-piece is drawn back to open the chamber of the fire-arm, the pin *n* takes against the flange of the cartridge and draws it partially out, leaving the subsequent removal to be done by hand, and the case may be preserved for subsequent use.

Having thus fully described the nature, object, and purpose of this invention, what is claimed therein as new, and desired to be secured by Letters Patent, is—

1. So constructing and arranging the breech-plate and hammer as that when the hammer is on the cock and the breech-plate drawn back to open the breech or bore of the arm for the insertion of the cartridge neither can be made to fly up by the accidental or otherwise touching of the trigger, substantially in the manner described.

2. So combining the hammer and an independent breech-plate as that the hammer shall lock the breech-plate when both are up against the end of the bore, and the breech-plate lock the hammer when both are swung back to open the bore or chamber, substantially as herein described.

3. So constructing and arranging a hammer and an independent breech-plate as that while moving upon different centers and in different arcs they shall both, when up against the end of the barrel or bore of the arm, occupy substantially the same space, as herein described and represented.

4. In combination with a hammer arranged behind and acting in rear of the breech-plate, the pivoting of said hammer in front of the pivot of the breech-plate, substantially as and for the purpose described.

JOSEPH RIDER.
E. REMINGTON & SONS.

Witnesses:
A. B. STOUGHTON,
HAVER. FENDRICH.